US006108643A

United States Patent [19]

Sansone

[11] Patent Number: 6,108,643

[45] Date of Patent: Aug. 22, 2000

[54] SYSTEM FOR METERING PERMIT MAIL THAT HAS AN ENCRYPTED MESSAGE AFFIXED TO A MAIL PIECE

[75] Inventor: Ronald P. Sansone, Weston, Conn.

[73] Assignee: Pitney Bowes Inc., Stamford, Conn.

[21] Appl. No.: 09/083,603

[22] Filed: May 22, 1998

[51] Int. Cl.[7] .......... G06F 17/00

[52] U.S. Cl. .......... 705/62; 705/408

[58] Field of Search .......... 705/406, 408, 705/401, 410, 60, 62; 283/71, 72; 235/382, 462, 468, 491, 375

[56] References Cited

U.S. PATENT DOCUMENTS

| | | | |
|---|---|---|---|
| 3,869,986 | 3/1975 | Hubbard | 101/91 |
| 4,649,266 | 3/1987 | Eckert | 235/432 |
| 4,802,218 | 1/1989 | Wright et al. | 380/23 |
| 4,831,555 | 5/1989 | Sansone et al. | 358/1.14 |
| 5,257,196 | 10/1993 | Sansone | 705/403 |
| 5,554,842 | 9/1996 | Connell et al. | 235/491 |
| 5,569,317 | 10/1996 | Sarada et al. | 524/111 |
| 5,826,247 | 10/1998 | Markl et al. | 705/409 |

*Primary Examiner*—Emanuel Todd Voeltz
*Assistant Examiner*—Thomas A. Dixon
*Attorney, Agent, or Firm*—Ronald Reichman; Michael E. Melton

[57] ABSTRACT

A permit mail metering system that preprints the non-variable portion of an indicia. The pre-printed portions may be printed with a fluorescent and phosphorescent ink, while other pre-printed portions may be printed using standard colored or black inks. The postal indicia also includes an encrypted code for added security. Some variable printed portions may be printed with a fluorescent and phosphorescent ink, while other variable portions may be printed using standard colored or black non-luminescent inks.

18 Claims, 9 Drawing Sheets

FIG, 7A
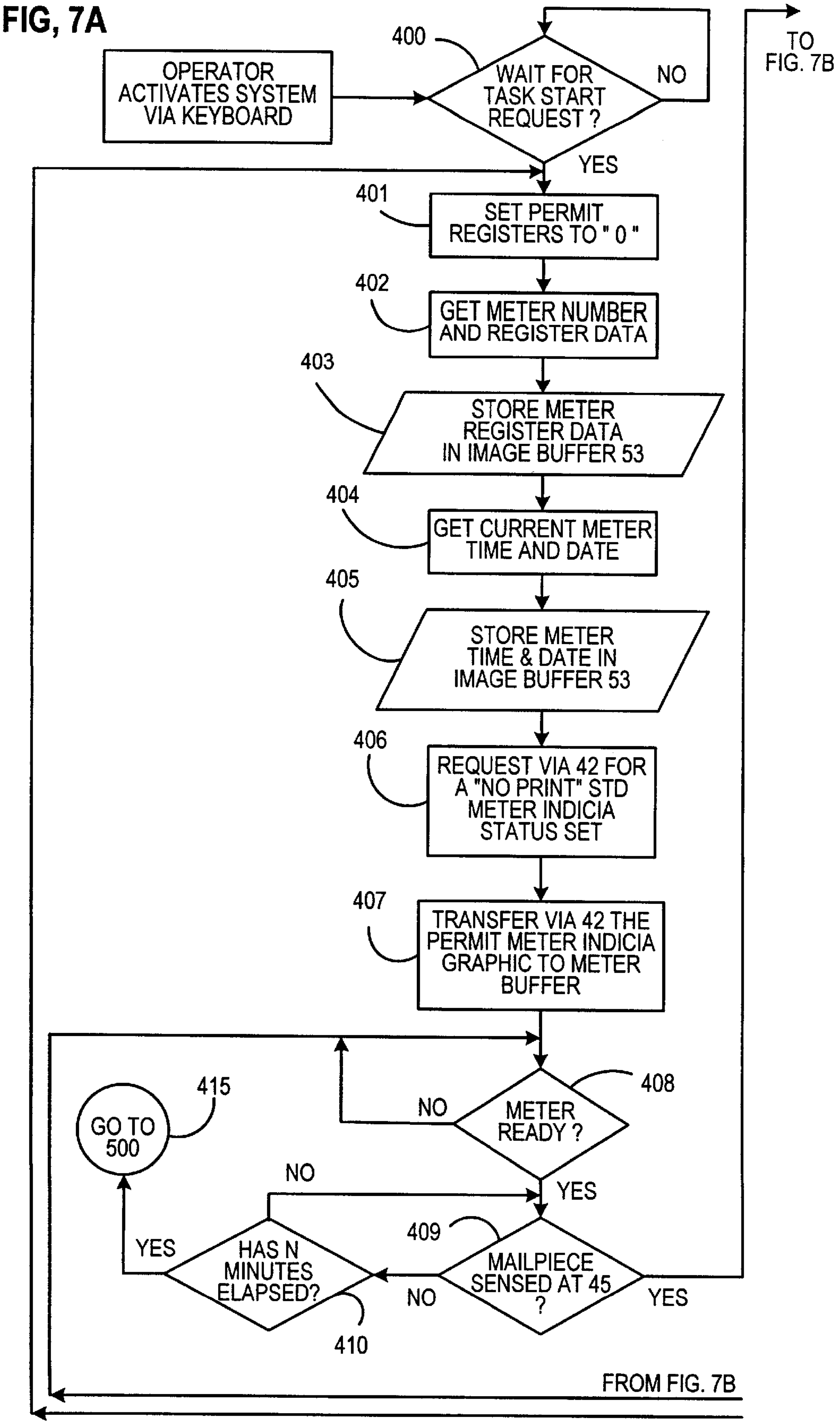

SYSTEM FOR METERING PERMIT MAIL THAT HAS AN ENCRYPTED MESSAGE AFFIXED TO A MAIL PIECE

CROSS REFERENCE TO RELATED APPLICATIONS

Reference is made to commonly assigned co-pending patent application Ser. 09/083,952 filed herewith entitled "A System For Metering Permit" in the name of Ronald Sansone.

FIELD OF THE INVENTION

The invention relates generally to the field of mailing systems and more particularly to secure permit mailing systems.

BACKGROUND OF THE INVENTION

Governments have created postal services for collecting, sorting and distributing the mail. The postal service typically charges mailers for delivering the mail. Mailers may pay the post for its service by purchasing a stamp, i.e., a printed adhesive label, issued by the postal service at specified prices, that is affixed to all letters, parcels or other mail matter to show prepayment of postage. The placing of one or more stamps on a mail piece is a labor intensive endeavor. Thus, stamps typically are used by individuals, small or home offices and small businesses.

Another means of payment accepted by the post is mail which is metered by a postage meter. A postage meter is a mechanical or electromechanical device that: maintains, through mechanical or "electronic registers" or "postal security devices," an account of all postage printed, and the remaining balance of prepaid postage; and prints postage postmarks (indicia) or provides postage postmarks (indicia) information to a printer, that are accepted by the postal service as evidence of the prepayment of postage. A postage meter is able to affix two to eight postal indicia to two to eight mail pieces in one second. Thus, postage meters may be used by individuals small or home offices, small businesses and large business.

Other means of payment accepted by the post is payment for manifest mail and payment for permit mail. In a typical manifest mailing system, a mailer produces mail in accordance with a mail manifest list and determines the quantity of mail and weight thereof. Then the mailer prepares the appropriate postal forms and delivers the mail and forms to the post. Thereupon, the post checks the manifest list and the appropriate forms and checks the quantity and weight of the mail. The post also requires permit imprints to be printed on the mail piece. The mailer prepares postal forms and brings the mail and postal forms to the post office. The post office checks the forms, checks the mail pieces and confirms that the completed forms coincide with the checked mail pieces. Then the postal clerk debits the value of the postage placed on the mail pieces from the mailer's postal account. Groups of individuals and businesses that produce very large quantities of mail use manifest and permit mail.

A disadvantage of the current manifest and permit mailing systems is that the systems are very labor intensive and provide little security. The intensive labor component is the completion of the forms and submission of the mail and forms by the mailer to the post office and the review and acceptance of the forms and associated payment process and mail by the post office.

Another disadvantage of the prior art was the inability of the post office to automatically check that a particular postal indicia has been accounted for. Thus, people, assisted by machines, are used to produce permit mail. Thereafter, the mailer and the post use manual acceptance procedures to check the mail and forms to assure appropriate payment.

Another disadvantage of the prior art is that permit mail is only able to enter the post during certain postal working hours.

SUMMARY OF THE INVENTION

This invention overcomes the disadvantages of the prior art by utilizing a system that reduces the amount of labor required to produce permit mail and makes it more difficult to submit permit indicia to the post that has not been paid for. The foregoing is advantageous to the mailer because it reduces the amount of time the mailer spends in the preparation of postal forms and the performing of postal procedures. The foregoing is advantageous to the post office because it makes it more difficult to submit permit mail that has not been paid for. This invention utilizes encryption to make it more difficult to print unauthorized postage.

Another advantage of this invention is that the variable data indicia printer is able to run at a more rapid rate than normal indicia printers because the amount of information to be printed is much less. This is important because it saves the mailer labor and time and it enables the mail to reach the post office sooner. The foregoing is advantageous to the post office by reducing the acceptance processing time. This reduces the post office's labor and enables the mail to enter the delivery system sooner.

BRIEF DESCRIPTION OF THE DRAWINGS

FIG. 4 is a drawing showing the pre-printed postal indicia of FIG. 3 containing variable information specific to the piece of mail that the indicia has been affixed to;

DETAILED DESCRIPTION OF THE PREFERRED EMBODIMENT

Figure 1:
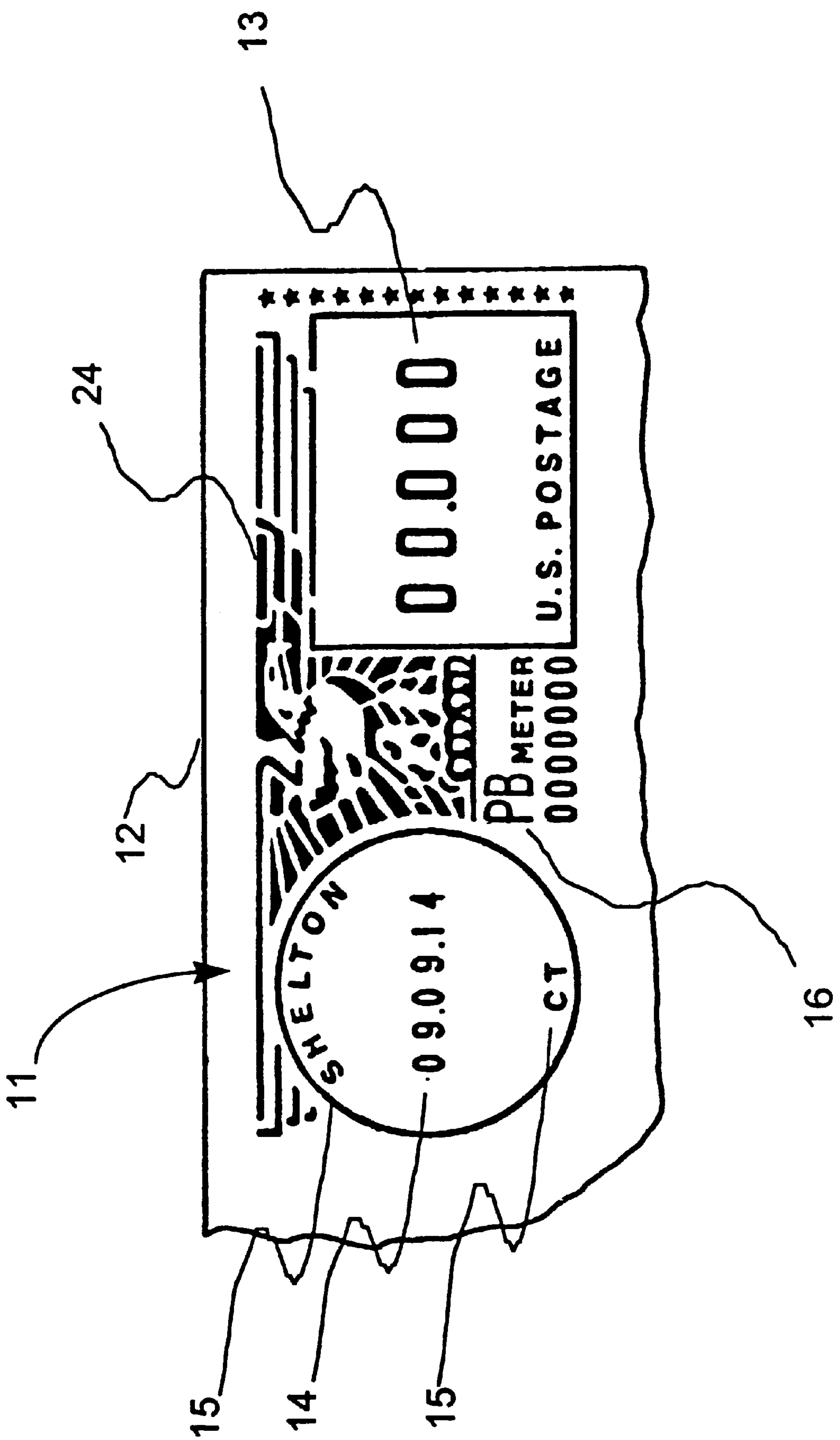
FIG. 1 is a drawing of a conventional prior art postal meter indicia containing normal accounting and security features, printed by conventional printing or bit map generated printing.

Referring now to the drawings in detail, and more particularly to FIG. 1, the reference character 11 represents a postal indicia that contains normal security features (meter number) printed by conventional printing or bitmap generated printing. The postal indicia 11 contains a dollar amount 13, the date 14 that the postal indicia was affixed to mail piece 12, the place the mail piece originated from 15, and the postal meter serial number 16 (for authentication).

Figure 2:
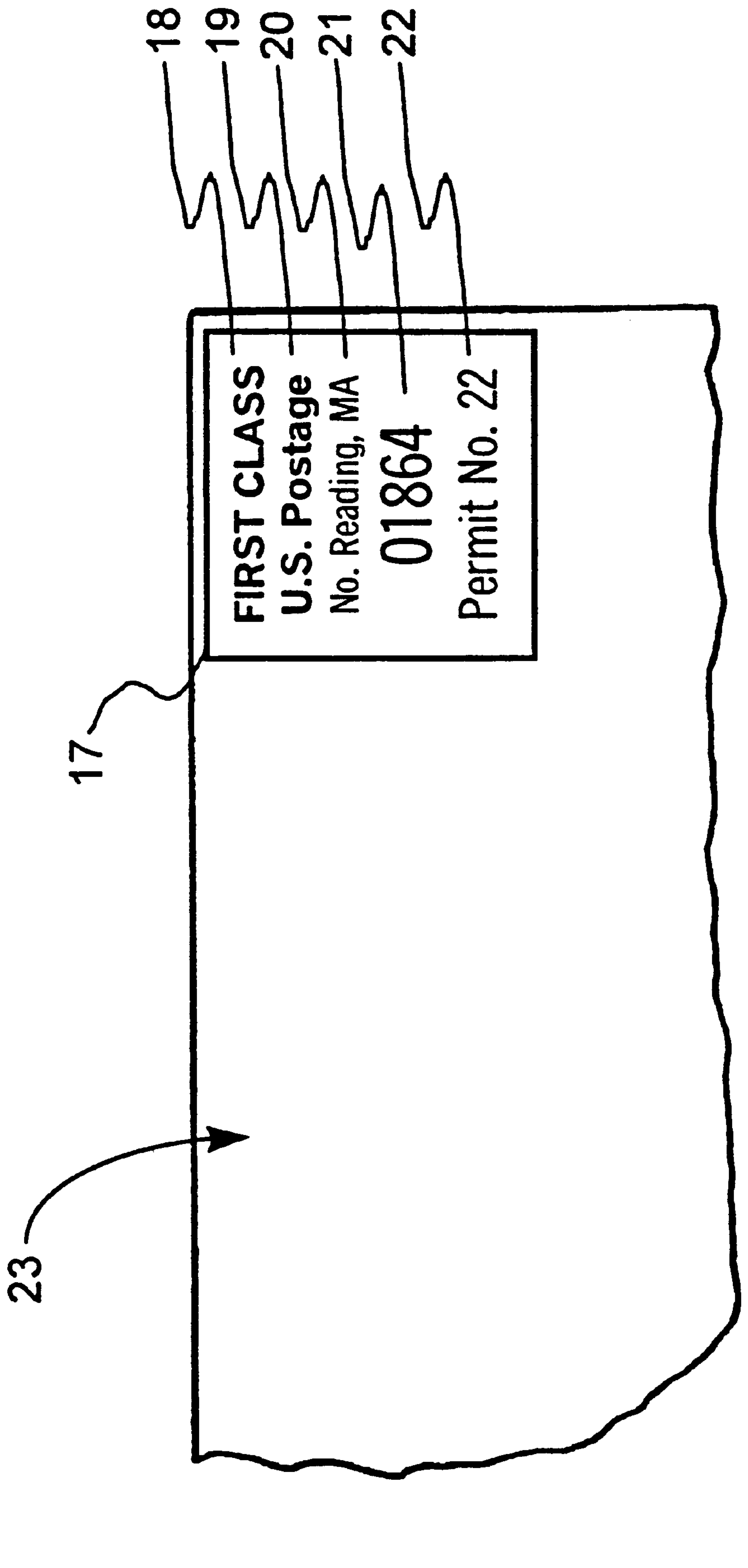
FIG. 2 is a drawing of a conventional prior art permit indicia containing normal features, either pre-printed by conventional means or by bitmap generated printing.

FIG. 2 is a drawing of a conventional prior art permit indicia containing normal features, either pre-printed by conventional means or by bitmap generated printing. The permit indicia 17 contains the class of mail 18, the name of the country 19, the city and state 20 of the post office that issued the permit, the zip code of the post office that issued the permit 21, and the permit number 22.

Figure 3:
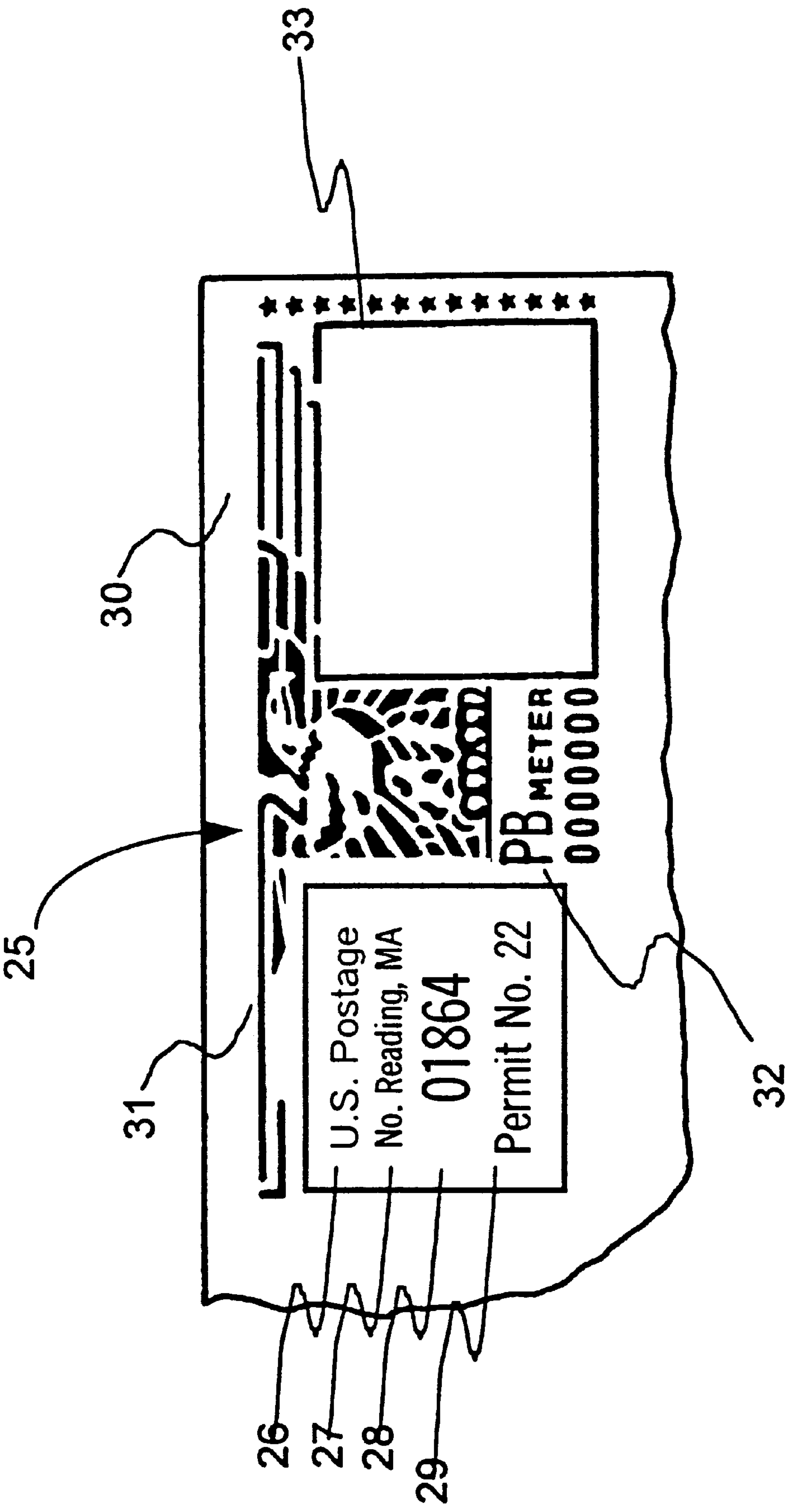
FIG. 3 is a drawing of a pre-printed metered permit postal indicia.

FIG. 3 is a drawing of a pre-printed metered permit postal indicia 25 on a mail piece 30. Indicia 25 contains the name of the country 26 to whom the postage is going to be paid, the city and state 27 of the post office that issued the permit, the zip code 28 of the post office that issued the permit, the permit number 29, an eagle 31, the postal meter serial number 32 and a block 33.

Indicia 25 may be pre-printed by conventional means or by bitmap generated printing, at a location remote from the mailer, i.e., at a printing subcontractor or at the mailer's premises, etc. Indicia 25 may be printed with a dual luminescent ink, i.e., an ink that is fluorescent and phosphorescent when radiated with ultraviolet light. An ink that is both fluorescent and phosphorescent when radiated with ultraviolet light is disclosed in the Sarada et al. U.S. Pat. No. 5,569,317, entitled "Fluorescent And Phosphorescent Tagged Ink For Indicia", herein incorporated by reference. It will be obvious to one skilled in the art that pre-printed indicia 25 may be printed with a normal black ink, red ink or any ink having a desired color. Indicia 25 may also be printed with a fluorescent ink or a phosphorescent ink.

Typically, luminescence will become visible to the naked eye and sensors when stimulated or excited by suitable radiation. Fluorescent inks and phosphorescent inks are types of luminescent inks. The emission of light from a fluorescent ink is caused by the absorption of energy (light or electromagnetic radiation) into the ink's molecules, which causes an excited state to emit or be fluorescent, and ceases abruptly when the energy source is removed. The emission of light from a phosphorescent ink will persist for a time interval after the ink source has been removed. A modulated ultra violet light source and suitable sensors can sense the pulses of fluorescent and phosphorescent ink combined on the mail piece.

The United States Postal Service and other Postal Services are currently selling stamps that have been printed with phosphorescent inks. They also require and accept postal indicia that have been printed by a postage meter that uses fluorescent inks. Current fluorescent inks that are used in postage meters approved by the United States Postal Service contain a fluorescent ink that is excited by a 254 nm ultra violet light source that emits a fluorescent light in the orange to red region of the visible spectrum between 580 to 650 nm.

Mail sorting equipment like the Advanced Facer Canceling System, manufactured by Siemens (Electrocom), are being used at Postal Incoming Mail Processing Stations to detect, sort and then cancel the phosphorescent stamps that have been affixed to mail pieces. These systems also check whether or not the postal indicia affixed to the mail pieces were affixed by an authorized meter, i.e., whether or not the indicia was made with a fluorescent ink.

The United States Postal Service Advanced Facer Canceller System (AFCS) faces (arranges mail so all addresses and indicia are facing the same way), cancels the stamp-bearing mail and then sorts letter mail into three mail streams: pre-bar coded letters, OCR readable(typed/machine imprinted) letters; and hand-written or script letters.

A dual luminescent ink is used so that the facer canceller will receive enough signal to trigger its sortation capabilities. The facer canceller may be set to recognize a mail piece having a dual luminescent ink as a new form of mail, that exhibits the phosphorescence of a stamp and the fluorescence of a postal indicia. The facer canceller may let the mail piece enter the mail system if the postage has been paid. If prior art permit mail entered the mail stream at this juncture, the mail piece would be rejected because prior art permit mail had to enter the post office and be subjected to the post office acceptance procedures.

A facer canceller will cancel a phosphorescent stamp, will not cancel a fluorescent postal indicia; and will remove other mail pieces that do not have FIMs. A FIM is a specified special bar code used by the post office.

Figure 4:
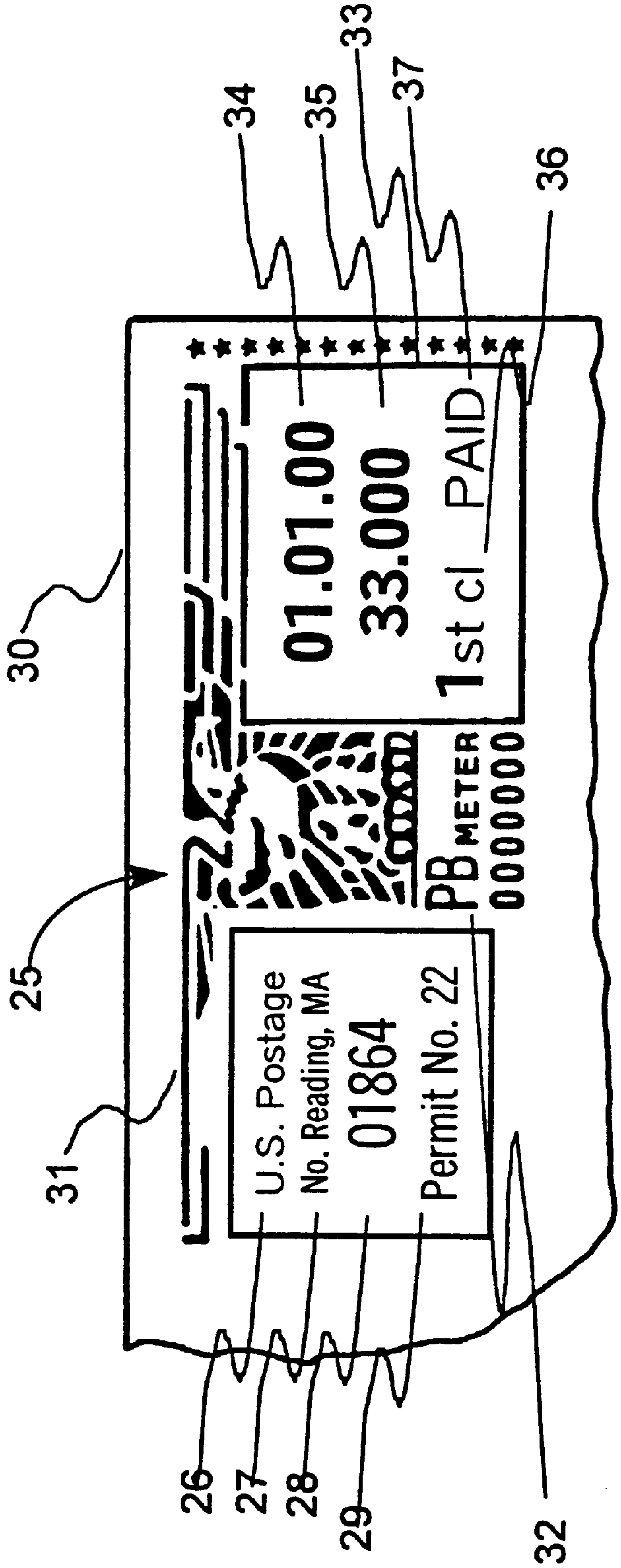

FIG. 4 is a drawing showing pre-printed postal indicia 25 of FIG. 3 containing variable information specific to the piece of mail that the indicia has been affixed to printed in block 33. Block 33 contains the date 34, the amount of postage 35, the class of postage 36 and an indication that the postage has been paid 37. It will be obvious to one skilled in the art that the information printed in block 33 may be printed in another area of indicia 25 or in an area in the vicinity of indicia 25.

In the event indicia 25 was preprinted with a fluorescent ink, then the date 34, the amount of postage 35, the class of postage 36, an indication that the postage has been paid 37 and the postal meter serial number 32 would be printed with a phosphorescent ink. In the event indicia 25 was preprinted with a phosphorescent ink, then the date 34, the amount of postage 35, the class of postage 36, an indication that the postage has been paid 37 and the postal meter serial number 32 would be printed with a fluorescent ink. In this example, the dual luminescence on the mail piece is performed in two steps.

The variable information printed in block 33 or in the vicinity of indicia 25 may be printed with a dual luminescent ink or with a normal black ink, red ink or any ink having a desired color. Thus, either the variable information 34, 35, 36 and 37 or the pre-printed information in indicia 25 will be printed with a dual luminescent ink.

Figure 5:
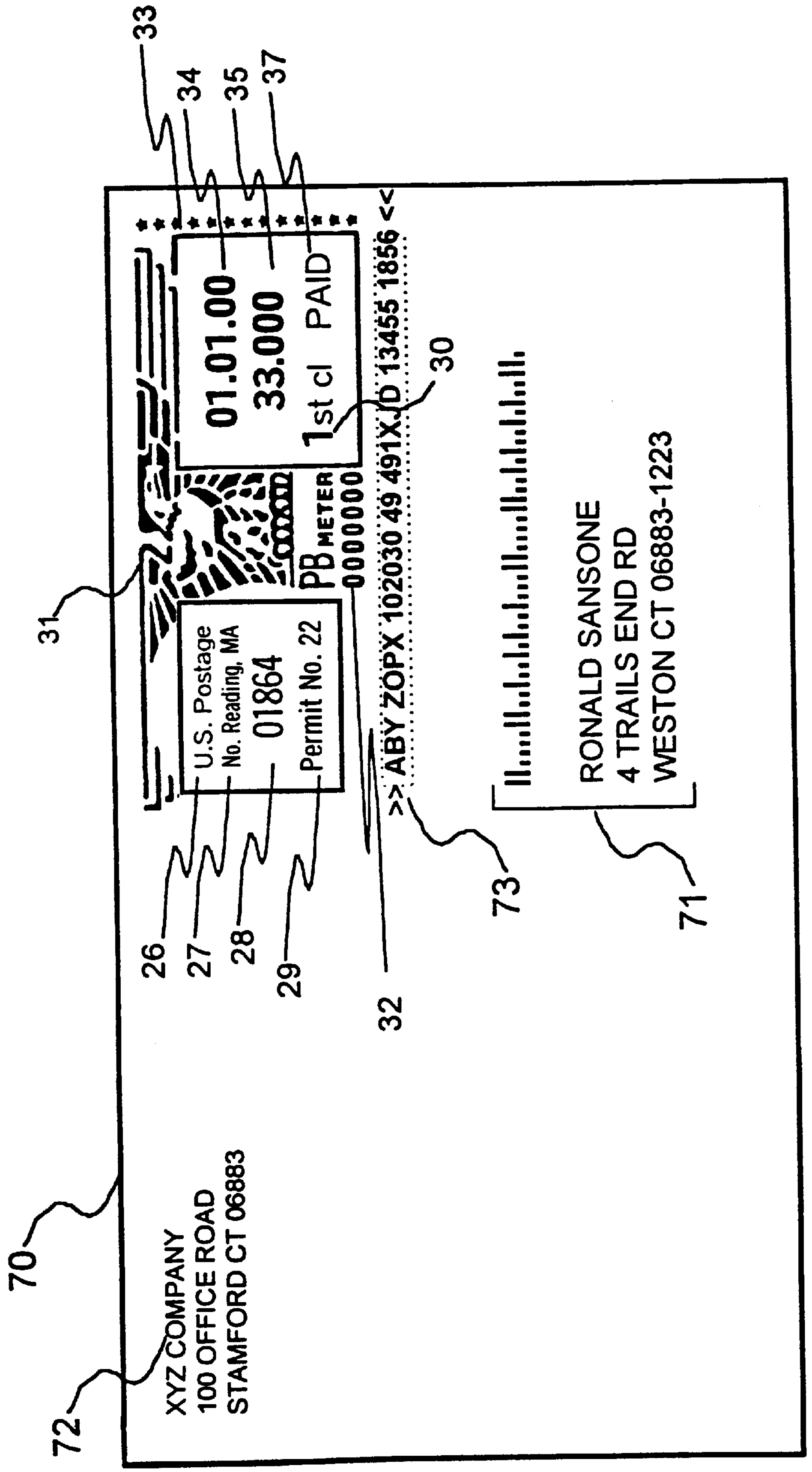
FIG. 5 is a drawing of the postal indicia shown in FIG. 4 containing encrypted information.

FIG. 5 is a drawing of the postal indicia shown in FIG. 4 containing encrypted information. The postal indicia is affixed to mailpiece 70. Mailpiece 70 has a recipient's name and address 71 and a return name and address 72. The postal indicia includes the name of the country 26 to whom the postage is going to be paid, the city and state 27 of the post office that issued the permit, the zip code 28 of the post office that issued the permit, the permit number 29, an eagle 31, the postal meter serial number 32 and a block 33. Block 33 contains the date 34, the amount of postage 35, the class of postage 36 and an indication that the postage has been paid 37. The postal indicia will also include an encrypted code 73.

The recipient's address 71 and relevant information contained in digital postage meter 59 (described in the description of FIG. 6) may be used to obtain encrypted code 73. The manner in which encrypted code 73 may be derived is disclosed in the Sansone et al. U.S. Pat. No. 5,831,555 entitled "Unsecured Postage Applying System" herein incorporated by reference. It will be obvious to one skilled in the art that encrypted code 73 and the other aforementioned elements may be placed in other locations on mail piece 70.

Encrypted code 73 may be printed with a dual luminescent ink, i.e., an ink that is fluorescent and phosphorescent when radiated with ultraviolet light. An ink that is both fluorescent and phosphorescent when radiated with ultraviolet light is disclosed in the Sarada et al. U.S. Pat. No.

5,569,317, entitled "Fluorescent And Phosphorescent Tagged Ink For Indicia", herein incorporated by reference. It will be obvious to one skilled in the art that code 73 may be printed with a normal black ink, red ink or any ink having a desired color. Encrypted code 73 may also be printed with a fluorescent ink or a phosphorescent ink.

Typically, luminescence will become visible to the naked eye and sensors when stimulated or excited by suitable radiation. Fluorescent inks and phosphorescent inks are types of luminescent inks. The emission of light from a fluorescent ink is caused by the absorption of energy (light or electromagnetic radiation) into the ink's molecules, which causes the ink's molecules to be in an excited state and to emit or be fluorescent, and ceases abruptly when the energy source is removed. The emission of light from a phosphorescent ink will persist for a time interval after the ink source has been removed. A modulated ultraviolet light source and suitable sensors can sense the pulses of fluorescent and phosphorescent ink combined on the mail piece.

Figure 6:
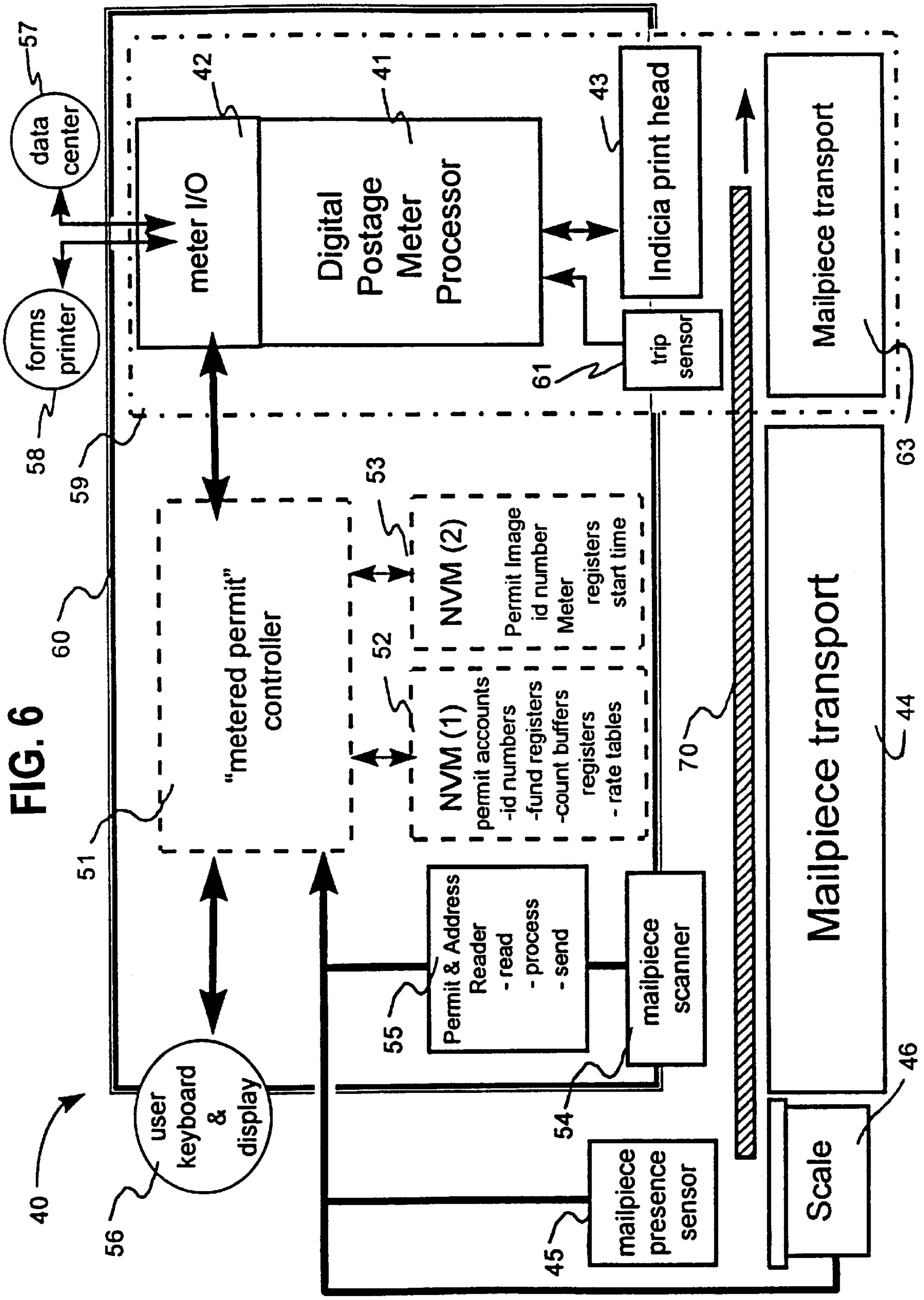
FIG. 6 is a block drawing of a permit mail metering system that utilizes encryption.

FIG. 6 is a block drawing of permit mail metering system 40. Meter system 40 includes: a digital postage meter 59; a meter permit controller 51 that is coupled to meter I/O 42; a non volatile memory 52 that is coupled to controller 51; a non volatile memory 53 that is coupled to controller 51; a permit mailpiece scanner 54; a permit address reader 55 that is coupled to scanner 54 and controller 51; a user keyboard and display 56 that is coupled to controller 51; a forms printer 58 that is coupled to I/O 42 and a data center 57, a mail piece presence sensor 45 that is coupled to controller 51, and a mail piece transport 44. Digital postage meter 59 includes: a meter processor 41; a meter I/O 42; an indicia print head 43 that is coupled to processor 41; a mail piece transport 63 and; a meter trip sensor 61 that is coupled to processor 41. Meter 59 also includes some support electronics (not shown) which are well-known to one skilled in the art. Postage meter 59 may be the B700 Post Perfect postage meter manufactured by Pitney Bowes Inc. of Stamford Connecticut. Processor 41, I/O 42, controller 51, memories 52 and 53, and reader 55 are contained in a secure housing 60. Secure housing 60 may be constructed in accordance with United States Federal Information Processing Standard 140-1, herein incorporated by reference.

Funds may be added to meter 59 by having meter 59 reset by data center 57. An example of a postage meter being reset by a data center is set forth in Eckert's U.S. Pat. No. 3,596,247 entitled "Automatic Register Setting Apparatus", dated Jul. 27, 1971, herein incorporated by reference.

When controller 51 receives instructions to print a report, the report will be printed by forms printer 58. Printer 58 will print a report containing: the date and time that indicia or blocks of indicia were affixed to mail pieces 70; the number of mail pieces 70 that an indicia has been affixed to; the total value of the affixed indicia; and internal billing identification, etc.

The aforementioned report may include other information desired by the post office or mailer.

When mail piece presence sensor 45 senses the presence of mail piece 70 in transport 44, I/O 42 sends a signal to controller 51. When meter trip sensor 61 senses the presence of mail piece 70, indicia print head 43 will be enabled to print. Meter system 40 may be run by an operator to process a small quantity of mail, i.e., one mail piece. The operator enters relevant information in response to questions displayed by controller 51 on display 56, via the display keyboard. When instructed to enter a mail piece by controller 51, the operator places a mail piece 70 on mail piece transport 44. At this point, controller 51 controls the operation of permit mail metering system 40. Controller 51 controls the operation of permit mail metering system 40. This will be more fully described in the description of FIG. 7.

Figure 7B:
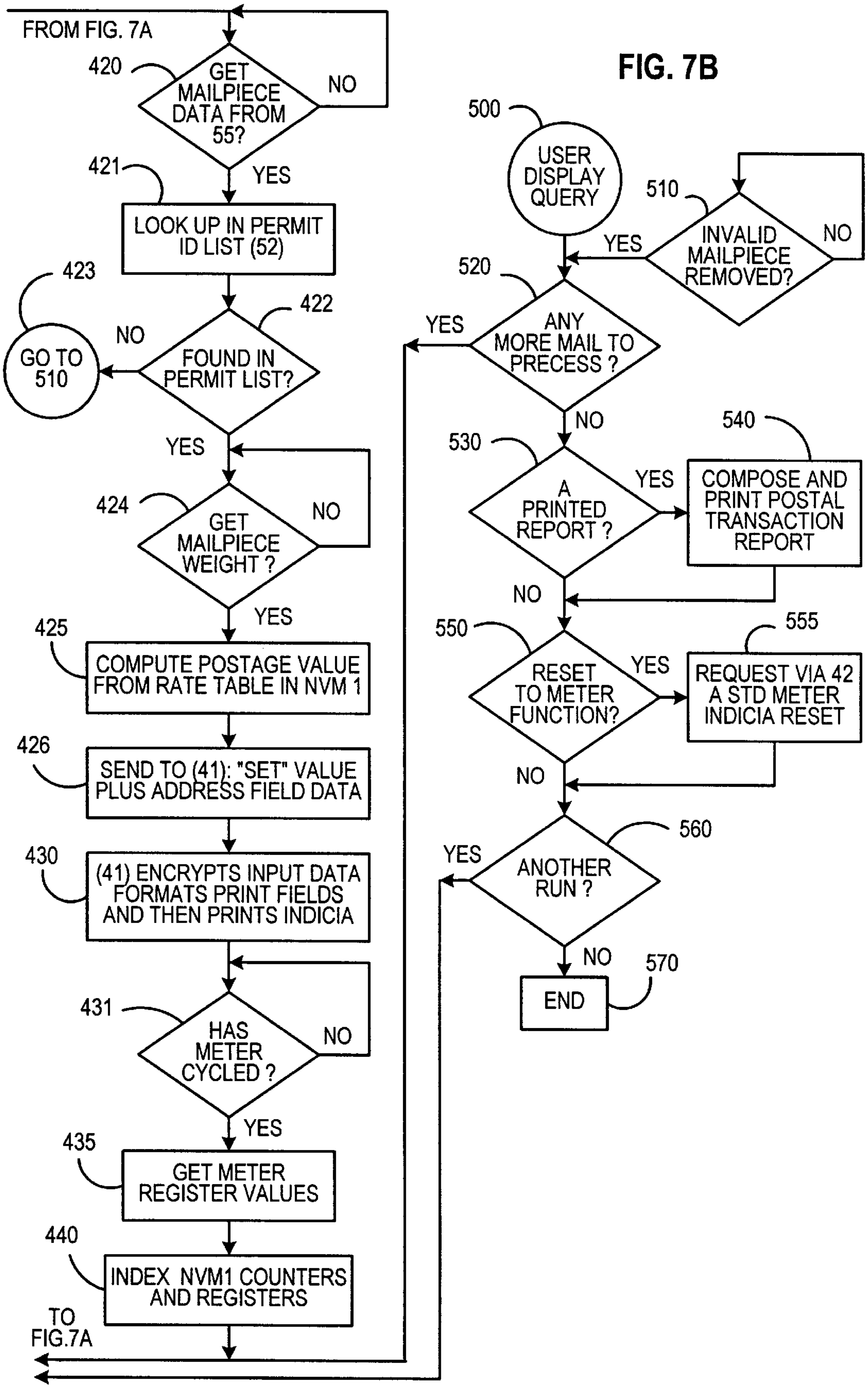
FIG. 7 is a drawing of a flow chart of the program contained in meter permit controller 51 of FIG. 6.

FIG. 7 is a drawing of a flow chart of the program contained in meter permit controller 51 of FIG. 6. The program begins when the operator activates permit mail metering system 40 by entering information into keyboard and display 56 via the display keyboard. Then the program goes to decision block 400 to determine whether or not the task start request has been received. If the task start request has not been received, then the program goes back to the input of block 400. If the task start request has been received, then the program goes to block 401 to set the permit registers to "0". Now the program goes to block 402 to obtain the meter serial number and register data. Then the program goes to block 403 to store the meter register data in nonvolatile memory 53. At this point the program proceeds to block 404 to obtain the current meter time and date. Then the program goes to block 405 to store the meter time and date in non-volatile memory 53. Now the program goes to block 406 to request via meter I/O 42 for meter 59 to be set so that it will not print a standard meter postal indicia. In block 407, the program transfers the permit meter indicia graphics to processor 41 via I/O 42.

At this point, the program goes to decision block 408. Decision block 408 determines whether or not meter 59 is ready. If block 408 determines that meter 59 is not ready, the program goes back to the input of block 408. If block 408 determines that meter 59 is ready, then the program proceeds to decision block 409. Decision block 409 determines whether or not mail piece 70 was sensed by mail piece presence sensor 45. If block 409 determines that mail piece 70 was not sensed by sensor 45, the program proceeds to decision block 410. Decision Block 410 determines whether or not N minutes has elapsed. If N minutes has not elapsed, the program proceeds back to the input of decision block 409. If block 410 determines that N minutes has elapsed, the program goes to block 415 and then to block 500 entitled user display query. Block 500 displays one or more questions on display 56. The operator reads the questions on display 56. If decision blocks 409 determines that mail piece 70 was sensed by sensor 45, the program proceeds to the input of decision block 420.

Block 420 determines whether or not the permit number and address field data was obtained from permit reader 55. If the permit number was not obtained from reader 55, the program goes back to the input of block 420. If block 420 determines that the permit number and address field data have been received from reader 55, the program goes to block 421 to look up the permit identification number in memory 52. Now the program goes to decision block 422. Decision block 422 determines whether or not the permit identification number was found in the permit list contained in memory 52. If block 422 determines that the number was not in the list, the program goes to block 423 and then to decision block 510. If block 422 determines that the number was in the list, the program goes to block 424.

Decision block 424 determines whether or not the mail piece weight was obtained. If the mail piece weight was not obtained, then the program goes back to the input of decision block 424. If the mail piece weight was obtained from scale 46 or the operator via keyboard and display 56, the program goes to block 425 to compute the postage value from the rate table in memory 52. Then the program goes to block 426. Block 426 sends the "set values" and the address field data to digital postage meter processor 41. Now the program goes to block 430. Block 430 instructs digital postage meter processor 41 to encrypt its input data, format print fields and print the postal indicia. Then meter 59 takes the aforementioned information and utilizes it to compute and print encrypted code 73. Then the program goes to decision block 431. Decision block 431 determines whether or not meter 59 has cycled. If meter 59 has not printed an indicia, the program goes back to the input of block 431. If meter 59 has printed an indicia, the program goes to block 435 to obtain the meter register values from memory 52. Then the program goes to block 440. Block 440 indexes the counters and registers in memory 52. Now the program proceeds to the input of block 408.

Decision block 510 determines whether or not the operator has removed an invalid mail piece 30 from meter 59. If block 510 determines that the operator removed an invalid mail piece 30, the program goes to decision block 520. Decision block 520 determines whether or not meter 59 has any more mail pieces 30 to process. If block 520 determines there are more mail pieces 30 to process, the program goes back to the input of decision block 408. If block 520 determines there are no more mail pieces 30 to process, the program goes to the input of decision block 530. Block 530 determines whether or not a report was requested to be printed. If the operator wants a report, the operator enters the relevant information via keyboard and display 56. If block 530 determines that a report was requested, the program goes to block 540. Block 540 composes and causes printer 58 to print a postal transaction report. The postal transactional report may contain the information contained in memories 52 and 53.

After the completion of the printing of the postal transaction report, the program proceeds to the input of decision block 550. If decision block 550 determined that a printed report was not required, the program would also proceed to the input of block 550. Block 550 determines whether or not to reset the meter function. If Block 550 determines to reset the meter function, the program goes to block 555. Block 555 requests meter I/O 42 to perform a standard meter indicia reset. Then the program goes to the input of decision block 560. If block 550 determines not to reset the meter function, the program will also go to the input of decision block 560. Block 560 determines whether or not another run was requested. If another run was requested, the program goes to the input of block 401 to set the permit registers to 0. If another run was not requested, the program goes to block 570 and ends.

Figure 8:
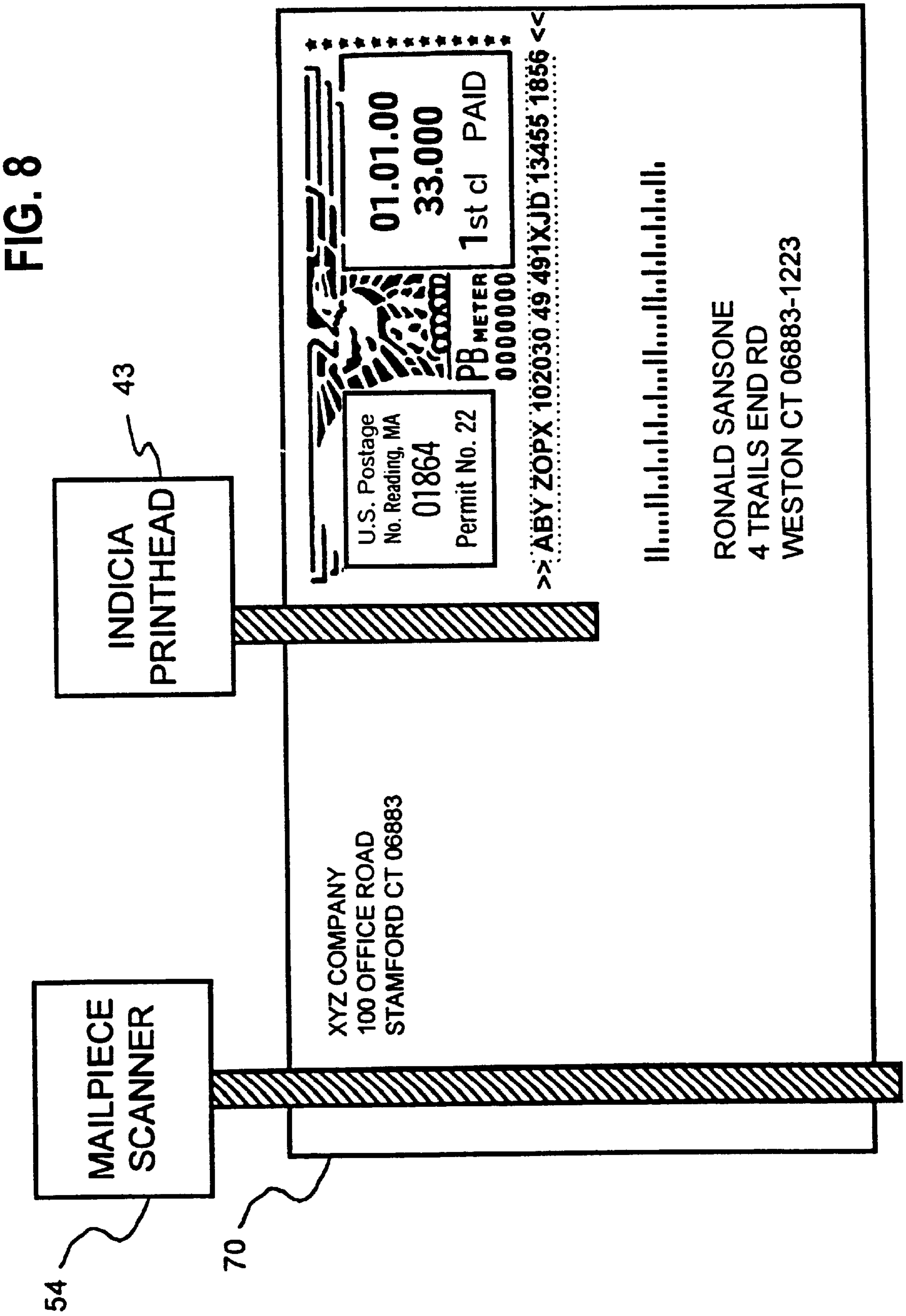
FIG. 8 is a drawing showing the relative positions of indicia print head 43 and mailpiece scanner 54 in relation to mailpiece 70 of FIG. 5.

FIG. 8 is a drawing showing the relative positions of indicia print head 43 and mailpiece scanner 54 in relation to mailpiece 70 of FIG. 5.

The above specification describes a new and improved permit mailing system. It is realized that the above description may indicate to those skilled in the art additional ways in which the principles of this invention may be used without departing from the spirit. It is, therefore, intended that this invention be limited only by the scope of the appended claims.

What is claimed is:

1. A system for metering permit mail, said system comprising:

means for pre-printing information on a mail piece to produce a postal indicia;

means for printing variable payment information within the postal indicia or within the vicinity of the postal indicia;

means for printing an encrypted code within the postal indicia or within the vicinity of the postal indicia wherein a portion of the pre-printed information is printed with a flourescent ink and the remaining portion of the pre-printed information is printed with a non-luminescent ink.

2. The system claimed in claim 1, wherein said first and second means are in different locations.

3. The system claimed in claim 1, further including means for collecting payment for the printed variable payment information.

4. The system claimed in claim 3, wherein said means for collecting payment is a postage meter.

5. The system claimed in claim 3, further including: means for recording payments for the printed postal indicia.

6. The system claimed in claim 3, further including:

a scale coupled to the postage meter to weigh the mail piece; and a rate table coupled to the meter so that the correct postage may be computed.

7. The system claimed in claim 3, further including a data center that is coupled to said collecting means so that additional funds may be remotely added to said means for collecting payment.

8. The system claimed in claim 3, wherein said means for collecting is a postal security device.

9. The system claimed in claim 8, wherein said means for collecting records collects variable security information.

10. The system claimed in claim 3, wherein the encrypted code is derived by information contained within a address on the mailpiece and information contained within the postage meter.

11. A system for metering permit mail, said system comprising:

means for pre-printing information on a mail piece to produce a postal indicia;

means for printing variable payment information within the postal indicia or within the vicinity of the postal indicia;

means for printing an encrypted code within the postal indicia or within the vicinity of the postal indicia wherein a portion of the pre-printed information is printed with a phosphorescent ink and the remaining portion of the pre-printed information is printed with a non-luminescent ink.

12. A system for metering permit mail, said system comprising:

means for pre-printing information on a mail piece to produce a postal indicia;

means for printing variable payment information within the postal indicia or within the vicinity of the postal indicia;

means for printing an encrypted code within the postal indicia or within the vicinity of the postal indicia wherein a portion of the variable information is printed with a flourescent ink and the remaining portion of the variable information is printed with a non-luminescent ink.

13. A system for metering permit mail, said system comprising:

means for pre-printing information on a mail piece to produce a postal indicia;

means for printing variable payment information within the postal indicia or within the vicinity of the postal indicia;

means for printing an encrypted code within the postal indicia or within the vicinity of the postal indicia wherein a portion of the variable information is printed with a phosphorescent ink and the remaining portion of the variable information is printed with a non-luminescent ink.

14. A method for paying for permit mail, said method includes the steps of:

placing funds in a postage meter;

printing a permit mail postal indicia with a postage meter;

deducting the value of the printed postal indicia from the meter; and printing an encrypted code within the postal indicia or within the vicinity of the postal indicia.

15. The method claimed in claim 14, wherein said printing step further includes the steps of:

pre-printing a portion of the postal indicia with fixed information; and printing variable information within the postal indicia or within the vicinity of the postal indicia.

16. The method claimed in claim 15, wherein the step of pre-printing further includes the step of pre-printing the fixed information with a dual luminescent ink.

17. The method claimed in claim 15, wherein the step of printing variable information includes printing the variable information with a dual luminescent ink.

18. The method claimed in claim 15, wherein the step of pre-printing further includes the step of pre-printing the fixed information with a fluorescent ink and the variable information with a phosphorescent ink.

* * * * *